(12) United States Patent
Gordon et al.

(10) Patent No.: US 11,491,382 B2
(45) Date of Patent: Nov. 8, 2022

(54) BASKETBALL PERFORMANCE MONITORING SYSTEM

(71) Applicant: SHOOTER'S TOUCH, LLC, Southbury, CT (US)

(72) Inventors: Steven J. Gordon, Weston, MA (US); Daniel P. Zuccarini, Shelton, CT (US)

(73) Assignee: SHOOTER'S TOUCH, LLC, Southbury, CT (US)

( * ) Notice: Subject to any disclaimer, the term of this patent is extended or adjusted under 35 U.S.C. 154(b) by 0 days.

(21) Appl. No.: 15/878,834

(22) Filed: Jan. 24, 2018

(65) Prior Publication Data
US 2018/0147468 A1 May 31, 2018

Related U.S. Application Data

(63) Continuation-in-part of application No. 15/083,612, filed on Mar. 29, 2016, now Pat. No. 10,500,464, (Continued)

(51) Int. Cl.
*A63B 69/00* (2006.01)
*A63B 71/06* (2006.01)
(Continued)

(52) U.S. Cl.
CPC ...... *A63B 69/0071* (2013.01); *A63B 24/0062* (2013.01); *A63B 71/0619* (2013.01); (Continued)

(58) Field of Classification Search
CPC ............ A63B 69/0071; A63B 24/0062; A63B 71/0619; A63B 2071/0647; (Continued)

(56) References Cited

U.S. PATENT DOCUMENTS 2,853,761 A 9/1958 Kettell et al.
3,037,367 A 6/1962 Ebertin
(Continued)

FOREIGN PATENT DOCUMENTS

WO 2007084850 7/2007
WO 2012121434 A1 9/2012

OTHER PUBLICATIONS

Partial European Search Report dated Oct. 20, 2017 for European Patent Application No. 15765286.8.
Extended European Search Report dated Jan. 29, 2018 for corresponding European Patent Application No. 15765286.8.

*Primary Examiner* — Werner G Garner
(74) *Attorney, Agent, or Firm* — Bachman & LaPointe, P.C.

(57) ABSTRACT

A system for creating and viewing indexed video snippets of a series of shots toward a goal comprising at least one sensor directly connected to a microprocessor, the microprocessor configured to trigger responsive to a ball-shooting detection of at least one of the series of shots toward the goal; electronic times that represent the accurate timing of a triggering event related to the ball-shooting detection; one or more video recordings captured by at least one recording source; wherein the electronic times are utilized to associate portions of the one or more video recordings with corresponding shots toward the goal; the associated portions are stored as separate video snippets; and the video snippets are indexed by the corresponding shots toward the goal.

11 Claims, 11 Drawing Sheets

Related U.S. Application Data which is a continuation-in-part of application No. 14/662,419, filed on Mar. 19, 2015, now Pat. No. 10,507,369.

(60) Provisional application No. 61/955,856, filed on Mar. 20, 2014.

(51) Int. Cl.
  *A63B 24/00* (2006.01)
  *G09B 19/00* (2006.01)
  *G07C 1/22* (2006.01)

(52) U.S. Cl.
  CPC .... *G09B 19/0038* (2013.01); *A63B 2071/065* (2013.01); *A63B 2071/0647* (2013.01); *A63B 2220/17* (2013.01); *A63B 2220/40* (2013.01); *A63B 2220/53* (2013.01); *A63B 2220/62* (2013.01); *A63B 2220/806* (2013.01); *A63B 2225/50* (2013.01); *G07C 1/22* (2013.01)

(58) Field of Classification Search
  CPC .......... A63B 2071/065; A63B 2220/17; A63B 2220/40; A63B 2220/53; A63B 2220/62; A63B 2220/806; A63B 2225/50; G09B 19/0038; G07C 1/22

See application file for complete search history.

(56) References Cited

U.S. PATENT DOCUMENTS

| | | | |
|---|---|---|---|
| 6,203,748 B1 | 3/2001 | Kumagai | |
| 6,389,368 B1 | 5/2002 | Hampton | |
| 6,758,769 B2 | 7/2004 | Nelson | |
| 8,191,556 B2 | 6/2012 | Betts | |
| 9,511,278 B2 | 12/2016 | Lee et al. | |
| 2002/0049102 A1 | 4/2002 | Taylor | |
| 2005/0176527 A1 | 8/2005 | Zuccarini | |
| 2008/0015061 A1* | 1/2008 | Klein | A63B 69/0071 473/447 |
| 2008/0254866 A1 | 10/2008 | Young et al. | |
| 2009/0111616 A1 | 4/2009 | Creelman | |
| 2011/0173235 A1* | 7/2011 | Aman | G06K 9/00342 707/792 |
| 2011/0306444 A1 | 12/2011 | McKay | |
| 2012/0099405 A1 | 4/2012 | Lidor et al. | |
| 2012/0322587 A1 | 12/2012 | Duke | |
| 2013/0095959 A1* | 4/2013 | Marty | A63B 24/0003 473/431 |
| 2014/0222177 A1* | 8/2014 | Thurman | A63B 60/46 700/92 |
| 2015/0058730 A1* | 2/2015 | Dubin | A63F 13/65 715/719 |
| 2016/0279498 A1 | 9/2016 | Gordon et al. | |

* cited by examiner

BASKETBALL PERFORMANCE MONITORING SYSTEM

CROSS-REFERENCE TO RELATED APPLICATION(S)

This application is a continuation-in-part and claims the benefit of non-provisional application Ser. No. 15/083,612 filed Mar. 29, 2016 which is a continuation-in-part and claims the benefit of non-provisional application Ser. No. 14/662,419, filed Mar. 19, 2015 which claims the benefit of provisional application Ser. No. 61/955,856, filed Mar. 20, 2014.

BACKGROUND

The present invention relates to a basketball performance monitoring system that utilizes a variety of sensors located in the vicinity of a basketball rim that can electronically track missed and successful shots, an associated electronic image capture system and a computer software system to transfer and utilize data generated therefrom for the purpose of monitoring, archiving and subsequent review.

In the game of basketball, it is well known that extensive practice of shooting a ball through a circular rim improves the frequency of making a goal. However, monitoring a player's skill level and improvements in making goals has typically been manually tracked and documented. Skills coaching could typically only be accomplished if the coach was present during a practice session, where feedback could only be given on the spot without any subsequent review.

Previously described systems have utilized a variety of sensor means to monitor shots taken, goals missed and goals made, however, they have not included an easy-to-use recording system that allows players and their coaches to track performance, review the shot-by-shot details of practice sessions and archive data for later viewing. For example, Hampton describes a sensing system that can determine the location of an ascending ball as it passes through a plane extending out from the rim and whether the result of such shot is successful or not. It includes using a telecommunication system to pass the sensor data to a computing device; however, it provides no means to monitor shot history nor is it able to tie such shot history to a video archive of the practice session.

Ianni et al. describes a system that uses a combination of a wrist or arm-mounted accelerometer to determine when a shot is taken and a net-mounted accelerometer to determine when a shot successfully made it through the goal. The system requires a relatively sophisticated acceleration profile correlation to differentiate between a shot and other types of arm motions and a goal versus a rim bounce. They describe a data archiving system, but do not utilize any type of corresponding visual recording. This type of sensor arrangement comes at a higher cost for the additional sensor and is higher complexity. It also has the disadvantage of requiring certain acceleration profiles of the basketball net when a ball passes through. This can prove to be unreliable, with variations of net size (loose or tight) and ball trajectories. A further disadvantage is that it requires a player to wear the accelerometer/radio unit on his/her wrist, which may not be to the liking of some players.

Zuccarini and Gordon have previously disclosed a contracting/expanding rim that may be used to improve skill levels; however, this system did not include any means for recording and tracking of practice sessions.

SUMMARY

In accordance with the present disclosure, there is provided a basketball performance monitoring system comprising a local microprocessor in communication with a remote computational system. At least one sensor is coupled to the microprocessor. The at least one sensor is coupled to a basketball goal and configured to sense at least one of an attempt to score a goal and a successful goal. In one embodiment, a first display is coupled to the microprocessor. A second display is coupled to the remote computational system.

In another embodiment a basketball performance monitoring system comprises a local microprocessor in communication with a remote computational system; a first sensor coupled to the local microprocessor; the first sensor is coupled to a basketball goal proximate a net. The first sensor comprises a housing including an arm extendable inside the net, wherein the first sensor is configured to sense an angular orientation responsive to a basketball passing over said arm.

In another and alternative embodiment, a basketball performance monitoring system comprises an array of sensors coupled to a basketball goal. The basketball goal has a backboard and a rim coupled to the backboard. The array of sensors is configured to determine shot information; the shot information comprises the existence of a shot of a basketball towards the goal, at least one of an impact of the basketball with at least one of the backboard and the rim, and a shot passing through the rim. A local microprocessor is coupled to the array of sensors. A remote computational system is in communication with the local microprocessor, wherein the local microprocessor transmits the shot information from the array of sensors to at least one of the remote computational system and a display coupled to the local microprocessor, the remote computational system or both.

In another and alternative embodiment, a method for monitoring basketball performance comprises sensing a basketball shot attempt by a player. The method includes detecting at least one of a completed goal or a missed goal. The method includes recording a time at which each basketball shot occurred. The method includes recording a visual image of the shot; reporting sensing the shot and detecting the completed goal and missed goal. The method includes synchronizing the recording of the visual image of the shot with sensing the shot, and the detecting of the completed goal and missed goal.

In accordance with the present disclosure, there is provided a system for creating and viewing indexed video snippets of a series of shots toward a goal comprising: at least one sensor directly connected to a microprocessor, the microprocessor configured to trigger responsive to a ball-shooting detection of at least one of the series of shots toward the goal; electronic times that represent the accurate timing of a triggering event related to the ball-shooting detection; one or more video recordings captured by at least one recording source; wherein the electronic times are utilized to associate portions of the one or more video recordings with corresponding shots toward the goal; the associated portions are stored as separate video snippets; and the video snippets are indexed by the corresponding shots toward the goal.

In another and alternative embodiment, an input device, the input device configured to view the video snippets on a remote computational device and the input device configured to select at least one of the shots toward the goal from a chart that graphically displays the series of shots and wherein such selection triggers a viewing of a corresponding video snippet.

In another and alternative embodiment, the at least one video recording source is directly connected to or part of a remote computational device; the electronic times are used to identify starting times and stopping times for videos being recorded on the computational device; the starting times and the stopping times are selected so as to capture an approximate start through an approximate end of each shot toward the goal of the series of shots; and each of the video recording portions corresponding to a single shot toward the goal are stored in separate electronic files.

In another and alternative embodiment, the at least one of the video recordings contain video of multiple shots; the electronic times are used to identify the starting times and stopping times for video editing on a computational device; the starting and stopping times are selected so as to capture the approximate start through the approximate end of each shot of the series of shots; and the video recordings of multiple shots are edited and stored as indexed multiple electronic files, one for each shot.

In another and alternative embodiment, wherein identifying the starting times and the stopping times uses a single event for synchronization between the electronic times and video time stamps.

In another and alternative embodiment, each the shot toward the goal of the series of shots includes goals and misses within a ball-shooting session.

In another and alternative embodiment, the single event for synchronization is the ball-shooting detection.

In another and alternative embodiment, the sensor is a ball impact sensor.

In another and alternative embodiment, the sensor is a ball approach sensor.

In another and alternative embodiment, the sensor is proximate a net.

In accordance with the present disclosure, there is provided a method for the remote monitoring of shooting sessions comprising: creating indexed video snippets of shots toward a goal based on electronic times that represent the timing of each shot toward the goal of a series of shots toward the goal as accurately measured by at least one sensor directly connected to a microprocessor; electronically displaying a chart that graphically displays the series of shots toward the goal; selecting one or more shots toward the goal from the chart; and viewing the corresponding one or more video snippets for the selected one or more shots toward the goal.

In another and alternative embodiment, the viewing occurs through a network on a remote computational system.

Accordingly, it is an object of the present invention to provide a basketball performance monitoring system to improve player skills and allow players, coaches and third parties to review performance at a later time.

It is also an object of the present invention to allow performance monitoring under different conditions, such as shooter position, shot number and rim diameter.

It is another object of the present invention to provide a simple-to-use computer interface that will allow subsequent performance review by a variety of individuals over a network.

It is yet another object of the present invention to utilize an optical retro-reflective sensor configuration to accurately monitor a basketball passing through a goal.

It is yet another object of the present invention to utilize a low-power, inexpensive set of motion sensors to accurately monitor a basketball passing through a goal.

It is a yet another object of the present invention to utilize video recording of basketball training sessions which is synchronized to shot-by-shot goal or miss data.

It is yet another object of the present invention to utilize an optical or radio frequency sensing system to determine the location on a court from which a shot was taken.

It is yet another object of the present invention to utilize a motion detector aimed above the goal to detect attempts that do not interact with the backboard or goal.

It is a further object of the present invention to synchronously share shot, electronic image and/or video data between players who may be located at different basketball goals.

It is an object of the present invention to provide a housing of a sensing element of a basketball performance monitoring system that may be easily attached and detached from the net of a basketball goal in order to measure the result of a basketball shot.

It is also an object of the present invention to allow a user to perform said attachment and detachment from a said basketball goal that is elevated high off the ground without the use of a ladder or requiring the lowering of said basketball goal.

It is another object of the present invention to provide a secure method of attachment of said housing to the net of said basketball goal that can remain secure during all phases of interaction between a basketball and said basketball goal and net.

It is yet another object of the present invention to provide a geometry of said sensor housing that minimizes the possibility of becoming tangled in said net.

It is yet another object of the present invention to provide a geometry of said sensor housing and sensing element that locates the center of mass of the sensor and housing system vertically under or slightly distal from a point vertically under the attachment point of the housing to said net.

It is a further object of the present invention to provide a geometry of said sensing element that maintains the arm of the sensor housing at or near the net and rim centerline so as to maximize the likelihood of an interaction with a ball that has passed through the basketball goal.

In accordance with the present disclosure, there is provided a basketball performance monitoring system sensor comprising a sensor housing coupled to a basketball goal proximate a net, the housing having a first end and a second end opposite the first end. The housing includes an arm proximate the second end and configured extendable inside the net. A U-shaped appendage is located between the first end and the second end. The U-shaped appendage is configured to couple to the net; wherein the sensor is configured to sense a vibration and/or an angular orientation responsive to a basketball passing over the arm.

In another embodiment a movable latch is coupled to the housing proximate the U-shaped appendage, the latch is configured to couple to the net in cooperation with the U-shaped appendage, the latch is configured to decouple from the net in cooperation with the U-shaped appendage.

In another embodiment the latch comprises a latch arm having a lower portion and an upper portion opposite the lower portion; a pivot is coupled to the latch arm proximate the lower portion, the pivot is coupled to the housing in a rotary fashion, a coupler is formed at the upper portion, the coupler is configured to trap the net against the U-shaped appendage, the coupler is configured to release the net from the U-shaped appendage.

In another embodiment the latch comprises a biasing member; the biasing member is configured to bias the coupler against the housing to trap the net.

In another embodiment the arm comprises a pair of insertion sides and a pair of removal sides adjacent the insertion sides, the pair of insertion sides and the pair of removal sides are located between an arm tip and an arm base opposite the arm tip, the arm tip being proximate the second end of the housing, wherein the pair of insertion sides are positively angled towards the arm tip and the pair of removal sides are negatively angled away from the arm tip.

In another embodiment a center of mass of the housing is located below a location of attachment of the U-shaped appendage, wherein the center of mass of the housing is located distally away from the arm tip and behind the location of attachment of the U-shaped appendage, wherein the location of attachment of the U-shaped appendage is attachable to the net.

In another embodiment the U-shaped appendage includes a depth configured to trap strings of the net.

In accordance with the present disclosure, there is provided a basketball performance monitoring system comprising at least one sensor is proximate a basketball goal, the basketball goal having a backboard and a rim coupled to the backboard; wherein the sensor comprises a sensor housing coupled to the basketball goal proximate a net. The housing has a first end and a second end opposite the first end. The housing includes an arm proximate the second end and configured extendable inside the net. A U-shaped appendage is located between the first end and the second end, the U-shaped appendage is configured to couple to the net. The at least one sensor is configured to determine shot information comprising a shot passing through the rim. A local microprocessor is coupled to the at least one sensor. A remote computational system is in communication with the local microprocessor, wherein the local microprocessor transmits the shot information from the at least one of sensor to at least one of the remote computational system and a display coupled to either the local microprocessor, the remote computational system or both.

In another embodiment the monitoring system is configured to determine if the basketball passed through the rim within a predetermined time; maintains a count of shots taken at the goal; and determines the shot completion percentage.

In another embodiment the display is configured to visually indicate the percentage of successful shots.

In another embodiment an additional display is coupled to the remote computational system; wherein the additional display is configured to remotely display the shot information.

In another embodiment the remote computational system is configured to store the shot information related to a session.

In another embodiment the at least one sensor comprises at least one of a goal detection sensor; a ball impact sensor and a ball approach sensor.

In accordance with the present disclosure, there is provided a method for installing and removing a basketball performance monitoring system sensor to a net of a basketball goal comprising coupling an installation rod to a housing of the sensor, wherein the sensor comprises a sensor housing, the housing having a first end and a second end opposite the first end. The housing includes an arm proximate the second end and configured extendable inside the net. A U-shaped appendage is located between the first end and the second end, the U-shaped appendage is configured to couple to the net; wherein the sensor is configured to sense an angular orientation responsive to a basketball passing over the arm. A latch is coupled to the housing proximate the U-shaped appendage. The latch is configured to rotatably couple to the net in cooperation with the U-shaped appendage. The latch is configured to rotatably decouple from the net in cooperation with the U-shaped appendage. The method includes attaching the housing to the net and detaching the housing from the net.

In another embodiment attaching the installation rod further comprises opening the latch, wherein the latch is configured to receive the net, the latch being cleared from the U-shaped appendage in order for the U-shaped appendage to receive at least a string of the net.

In another embodiment attaching the housing further comprises detaching the installation rod from the housing; wherein the latch is biased into a closed position relative to the U-shaped appendage responsive to the installation rod detachment; wherein the latch traps the net in the U-shaped appendage.

In another embodiment the installation rod and the housing are magnetically coupled.

In another embodiment coupling the installation rod to the housing of the sensor comprises the installation rod pushing the latch proximate the lower portion into an open position.

In another embodiment coupling the installation rod to the housing opens the latch allowing the sensor to be removed from or installed onto the net.

In another embodiment the method further comprises trapping at least two strings on opposite sides of a net knot of the net between the U-shaped appendage and the latch.

The foregoing objects are attained by the basketball performance monitoring system of the present invention.

The terms basketball system, baskets and in some instances basketball goal used throughout this description, all refer to the same entity, which typically includes a basketball backboard, a basketball rim attached to the basketball backboard, a basketball net hanging from the rim, and a means of supporting these items such as a pole, a ceiling structure, or some other structure capable of rigidly positioning these items at an appropriate height above a court floor. The terms rim and in some instances goal both refer to the substantially hollow circular configuration of a hoop and made from metal or other suitable material known in the art. The terms make, goal, basket and through the rim all refer to the same event of a ball passing from above through the inside of the circular rim. As used herein, the term U-shaped appendage may also refer to any geometry that enables the movable latch to trap the net strings.

In accordance with the present invention, a basketball performance monitoring system broadly comprises a basketball goal having a sensing means for acquiring data related to missed or made shots, a communication system to transfer said data to a remote computational and storage system, optional coordination of video capture of a training session and a software system to allow synchronization of optional video and shot data and review, sharing and comparison of optional video and shot data.

Other details of the basketball performance monitoring system are set forth in the following detailed description and the accompanying drawing wherein like reference numerals depict like elements.

DETAILED DESCRIPTION

Figure 1:
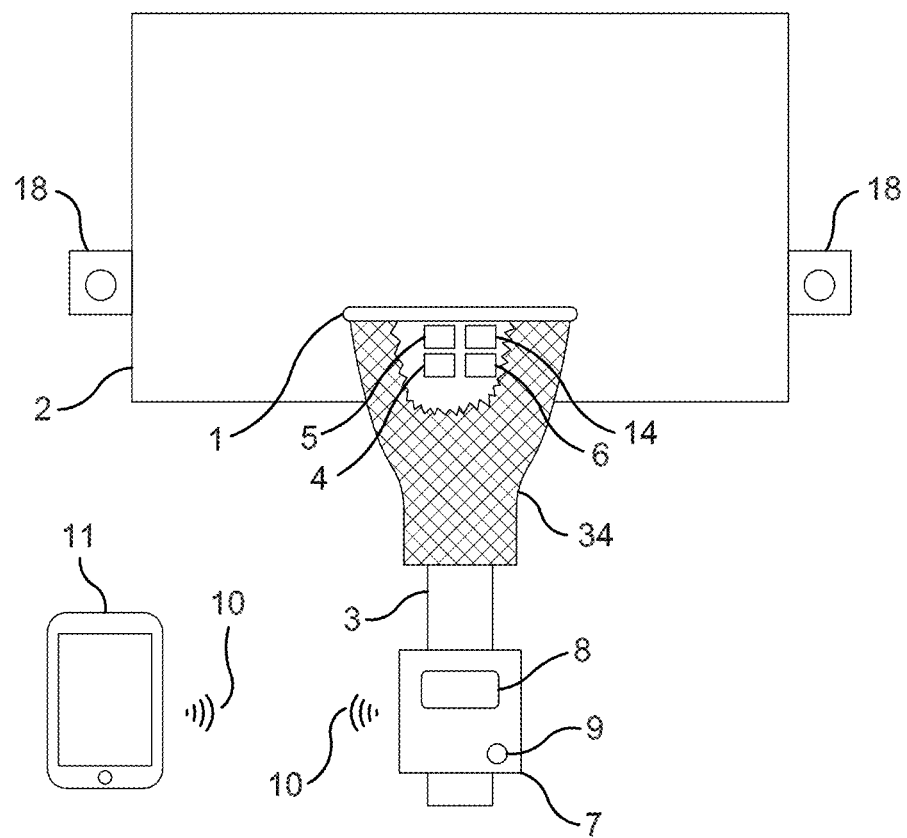
FIG. 1 illustrates a first embodiment of a basketball performance monitoring system in accordance with the present invention.

FIG. 1 illustrates a first embodiment of a basketball performance monitoring system in accordance with the present invention. The system includes a basketball rim 1 having a substantially circular configuration and made from metal or other suitable material known in the art. The system further includes a backboard 2 to which the rim 1 is mounted and a flexible net 34 attached below the rim 1 (collectively a goal). The backboard 2 may also be made from any suitable material known in the art. The net 34 may be made from any number of flexible materials including a metal chain, or a cotton or synthetic line. The rim 1 may optionally include a feature for collapsing or expanding its diameter as described in Zuccarini U.S. Pat. No. 7,402,116. Either mounted directly to or in the close vicinity of the rim 1, the backboard 2 or the net 34, is a ball impact sensor 4. The ball impact sensor 4 modality may be vibration, strain, acceleration, optical, video, acoustic or electromagnetic. The function of the ball impact sensor is to determine whether a shot has been executed that touches either the rim 1 or backboard 2. In one embodiment, a vibration sensor is utilized such as model SW18015 available from Jiayi Electronic Co., Ltd Zhejiang, China, which includes a small mass and spring system, that when excited, makes contact with a closely fitted conductive contact and completes an electrical circuit in a similar manner to a switch. The vibration sensor is sensitive enough to detect when a ball 33 creates a mechanical vibration by striking against either the rim 1 or backboard 2. The vibration sensor that serves as the ball-impact sensor 4 may be either an analog sensor, such as an accelerometer, or a digital switch, which when vibrated, changes between an open and closed circuit at a high frequency. The advantage of using an accelerometer is that it may more precisely measure the vibration magnitude over time and therefore better characterize the type of interaction between the ball 33 and the backboard 2 or rim 1; however, the disadvantage to such a sensor is that it consumes power while waiting for an impact. This may be an important consideration for a system that is designed to communicate wirelessly and remain in place for extended periods of time (months or years) without exchanging batteries or recharging. Since a switch-type sensor draws little or no power, it may be preferred over the accelerometer for low power embodiments. Alternatively, a switch type sensor may be used for the initial impact detection and then to signal the system to apply power to the accelerometer for a more precise measurement. The accelerometer may then be used to measure the vibration over some time period and then be powered down after the vibration event has subsided. Similarly, a switch-type vibration sensor may be used to wake the microprocessor 12 from a low-power sleep mode so that the microprocessor 12 may monitor all or a subset of its connected sensors during a period when the ball 33 is interacting with the rim 1, backboard 2 and/or net 34.

This first embodiment of the basketball performance monitoring system also has a goal detection sensor 5 mounted directly to or in close vicinity of the rim 1, backboard 2 or net 34.

The modality of the goal detection sensor 5 may be vibration, strain, acceleration, angle, tilt, optical, video, acoustic or electromagnetic. The goal detection sensor 5 is distinguished from the ball impact sensor 4, as it can determine whether a ball 33 has passed through the goal or not. In some cases, the detection of a ball 33 impacting either the rim 1 or backboard 2 by the ball impact sensor 4 may be followed by the goal detection sensor 5 detecting the ball 33 passing through the rim 1. Therefore, a local microprocessor 12 determines whether a missed shot or made goal is counted following the ball impact detection by monitoring whether the goal detection sensor 5 has been tripped within a specified time frame of the ball impact sensor 4 being tripped. In certain other cases, no ball impact is detected by the ball impact sensor 4, but the ball 33 passes through the goal without touching either the rim 1 or the backboard 2. In this case, the local microprocessor 12 would count an additional shot that resulted in an additional goal based on the exclusive input from the goal detection sensor 5. Thus, the basketball performance monitoring system may distinguish whether a shot resulted in a "swish", wherein a goal is the result of the ball 33 passing through the rim 1, but touching only the net 34 interior or a non-swish goal, wherein the goal is the result of the ball 33 first impacting the backboard 2 and/or rim 1 before passing through the rim 1.

Optionally, a third type of sensor, a ball-approach sensor 14, may be used to determine whether a ball is approaching the rim 1 prior to any potential contact. The sensor can be proximate the goal. In an exemplary embodiment, the sensor is close enough to the goal to detect an attempted shot anywhere from the court.

The modality of the ball-approach sensor 14 may be pyroelectric, optical, video, acoustic, capacitance, inductance or electromagnetic. The purpose of the ball-approach sensor is to determine that a ball has been released towards the rim 1 and to detect its approach before it arrives. It may serve as an "air ball" sensor to detect a miss that did not collide with either the backboard 2 or the rim 1 and which is not detectable by the impact sensor 4 or goal detection sensor 5. This ball approach sensor 14 may also be used to wake the microprocessor 12 from its sleep mode or as a signal to power up other sensors like an accelerometer-based ball impact sensor 4 as previously described.

Optionally, a fourth type of sensor, a rim diameter sensor 6, determines whether a contracting/expanding rim is at regulation diameter, a larger diameter or a smaller diameter. This information is passed to the microprocessor 12 or the remote computation system 11 so a shot may be associated with a conventional-sized rim 1 or a larger or smaller diameter one.

The optional display unit 7 is connected to the ball impact sensor 4, the goal detection sensor 5 and optionally the ball-approach sensor 14 and the rim diameter sensor 6 through a wire 13 or wireless connection or by way of the remote computation system 11 through a wired or wireless system. The display unit 7 includes one or more light emitting diodes (LEDs), LED character arrays, liquid crystal displays (LCDs) or other type of display 8 that is easily visible from the court. In this first embodiment, the display 8 displays the percent of goals versus total shots taken. It may also display additional data like wireless connectivity status, court time, shooter identification, number of shots taken, player location, etc.

Figure 9:
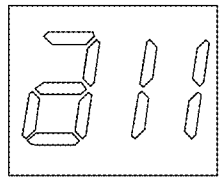
FIG. 9 illustrates a two-digit seven-segment display of the word "all"
Figure 10:
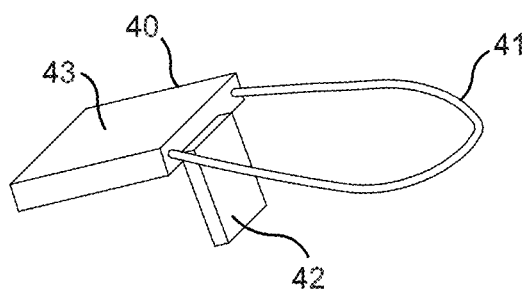
FIGS. 10 and 11 illustrate two versions of a preferred embodiment of a portion of the basketball performance monitoring system in accordance with the present invention.
Figure 11:
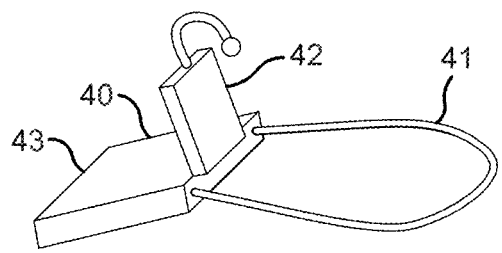

The local microprocessor 12 has a number of functions. For example, it monitors the sensors 4, 5, 6 and 14 on or near the rim 1 or net 34, provides timing and calculations to determine whether a shot measured by the ball impact sensor 4 resulted in a goal as measured by the goal detection sensor 5 within a certain amount of time, typically 2 or 3 seconds. The microprocessor 12 optionally maintains counts for shots taken in a shot counter and goals made in a goal counter and displays the dividend between them times 100 on the display 8 or on the remote computational system 11. Alternatively, the microprocessor 12 may relay the sensor outputs by wire 13 or wireless 10 to the remote computational system 11, which keeps the various counts. In a first embodiment, only two digits are required to display the percent goals and a two digit, seven-segment LED display is utilized. For the special case where no shots are missed and the percent of goals is 100, the two digit display cannot display the required three digits, but may be programmed to display "all" in its two digits to indicate all shots resulted in goals by configuring the first digit to display a lowercase "a" and the second digit to display two vertical lines "| |" as shown in FIG. 9.

The display unit 7 may be located anywhere near the basketball goal where it is visible to players and where it may be in communication with the sensors by wire 13, or wireless or alternatively, it may be in communication with the remote computational system 11. In this first embodiment, it is mounted to the pole 3 that supports the backboard 2 and rim 1 and connected to the rim sensors 4, 5, 6 and 14 by a wire cable 13. It may be optionally mounted behind a clear backboard 2, on a different part of the backboard 2 and rim 1 support structure or on a nearby surface or wall.

The display unit 7 also optionally includes a reset button 9 either mounted on the unit or positioned remotely. The reset button 9 resets all counts including the shot counter and goal counter and timings in the microprocessor 12 and/or in the remote computational system 11, so that a new set of data may be taken. This is typically used after the end of a practice session or between different drills or players practicing individually. In addition to maintaining a count for shots taken in a shot counter and goals made in a goal counter, the microprocessor 12 also optionally maintains a count in seconds or milliseconds, etc. of the time since the last reset or if no reset was pushed, since the last power on event. A "soft" reset of the microprocessor counts (i.e. the shot counter and the goal counter), which does not require a player to touch a reset button 9, may also be signaled by either the remote computational system 11 or by a player identifying his desire to reset through a sequence of shots over some time horizon. For example, three successive misses that trigger the ball impact sensor 4 over a time horizon that is significantly shorter than the time expected in a normal shooting drill may be an appropriate code. Another appropriate code may be to purposely miss two or more shots in fewer than 5 seconds. One skilled in the art may think of many such codes that are unlikely to arise during normal shooting drills, so they may be used to signal a reset of the microprocessor counts.

This first embodiment of the basketball performance monitoring system has one or more optional recording sources 18 for recording play on the court. The optional one or more cameras 18 may be mounted either alongside, above, below, or behind the backboard 2, near the rim 1 mount, on the court, near the sideline, on a wall, attached to a player, or held by hand anywhere in the vicinity of the court. The cameras 18 may also be part of the remote computation system 11. For example, they may be the embedded cameras within a cellular phone or mobile tablet. The cameras 18 are used for electronic capture of the shooter or the action on the court that leads up to a shot being taken. The type of camera may be an electronic still camera, a video camera, an infrared camera, a set of stereo cameras, or a 3D scanner, such as a Lidar system or Microsoft Kinect sensor. Recording may be during practice drills, plays or during actual game play. The recorded data may also be processed by a machine vision analysis system to extract data from the 2D or 3D images. This could include player identification, identification of shot location on the court or the type of shot (free through, layup, jump shot, 3-point shot, etc.), identification of type of executed play, ball trajectory, etc. Alternatively, the electronic capture from the camera 18 may be streamed to other devices or recorded for future playback. One skilled in the art understands that more than one type of data may be simultaneously recorded by one or more cameras 18 for one or more uses. For example, data capture for both player positioning and recording for future playback could be recorded by two separate cameras.

This first embodiment of the basketball performance monitoring system also includes a wireless connection 10 to a remote computational system 11. The remote computational system 11 is able to wirelessly capture the variables from a practice session from the microprocessor 12. This may include identification of the microprocessor 12 sending the information, elapsed time from the beginning of the session to the time of each goal or miss, whether each shot was a goal or a miss, the state of the rim 1 (contracted or regulation size), the total number of shots and the percent of shots that were goals. Other variables such as the number of goals, the time since power on, battery level, etc. may also be sent.

Figure 2:
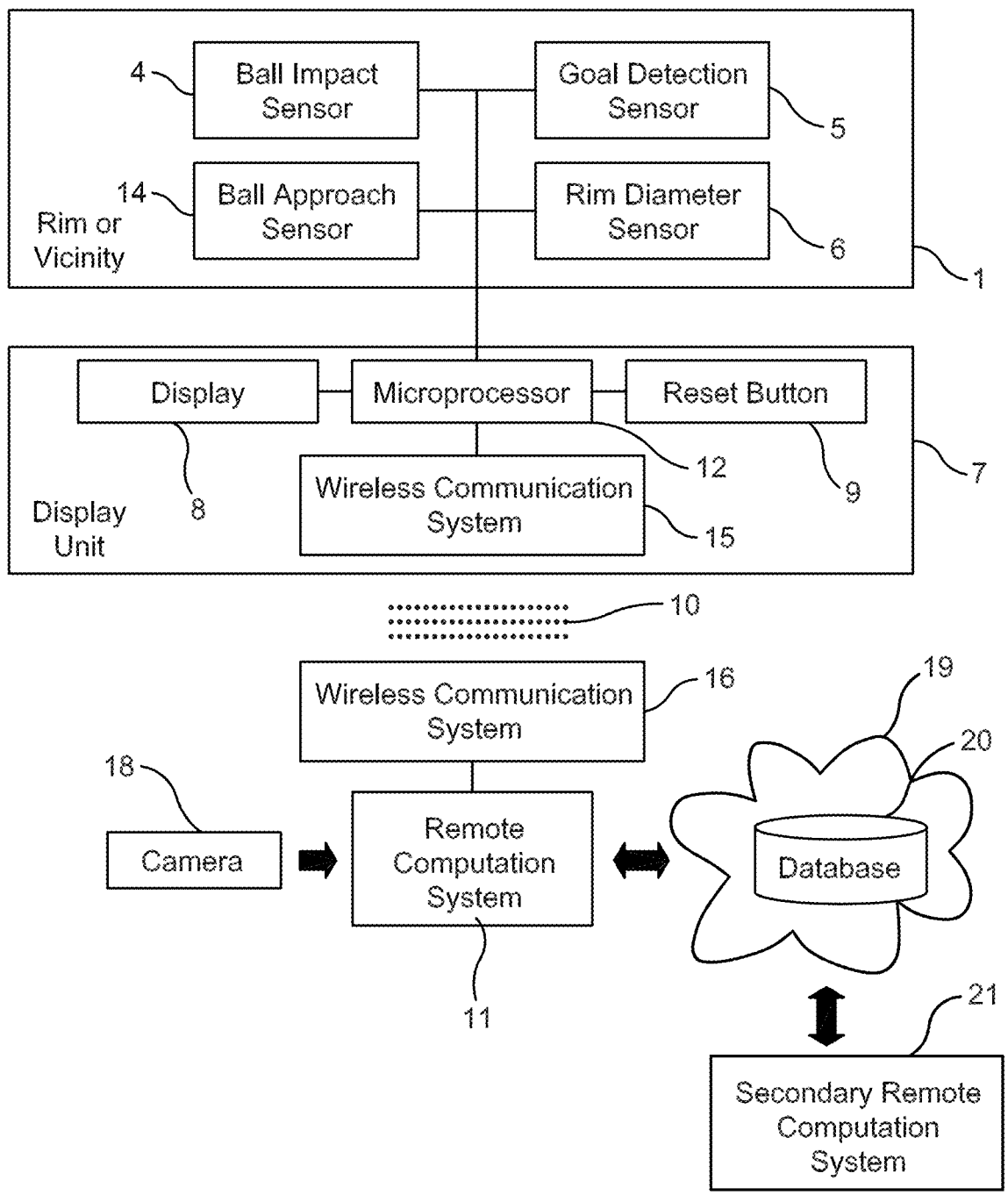
FIG. 2 and FIG. 3 illustrate block diagrams of a second and third embodiment of a basketball goal system in accordance with the present invention.

Referring now to FIG. 2, a second embodiment of the present invention is illustrated. In this embodiment, the ball impact sensor 4, the goal detection sensor 5, the ball approach sensor 14 and the rim diameter sensor 6 are all connected to the microprocessor 12 in the display unit 7. The wireless communication system 15 in the display unit 7 communicates wirelessly 10 to a second wireless communication system 16 attached to or within the external remote computational system 11. The external remote computational system 11 also accepts input from a video recording source 18. The video recording source or camera 18 may either be directly connected to or a part of the remote computational system 11 to allow for immediate digitization into a file, or the video recording source 18 may be independent and record practice sessions separately and later transfer saved data to the remote computational system 11 or a completely separate computer. If directly connected, the remote computational system 11 will inherently be able to determine which time points from the video recording source 18 correspond to which goals or misses that were recorded by the sensors 4, 5, 6, 14 on the rim 1. If the video recording source 18 is independent, then when the video data is transferred, it must be synchronized to the goal timing received wirelessly 10 from the microprocessor 12. This may be accomplished by assuring that any video time stamps recorded by the video recording source 18 are synchronized with the real time clock within the remote computational system 11. Alternatively, the start of the video recording could occur simultaneously with the pressing of the reset button 9 on the display unit 7 or by soft reset. This ensures that as long as the timing electronics in both the video recording device 18 and the remote computational system 11 are accurate, the amount of time from the start of a session to the time that the ball 33 hits the rim or makes a goal are the same between the video recording device 18 and the microprocessor 12.

In this second embodiment, when the microprocessor 12 wirelessly 10 sends the shot data to the remote computational system 11, it also sends the elapsed time from the beginning of the session, that is, when the reset button 9 is pressed or a soft reset occurred, to the time of each ball detection by either the ball impact sensor 4 or the goal detection sensor 5. Alternatively, the microprocessor 12 and the remote computational system 11 may both have real-time clocks, which only need to be infrequently synchronized, as is commonly practiced. If the video recording is from an unconnected independent video source 18 and the start of the video was not synchronized with the initiation of the session, then a manual synchronization may easily be executed by an operator indicating to the remote computational system 11 or a secondary remote computational system 21 when for example the ball in the first shot in the video impacted the rim or backboard by pressing a keyboard key or clicking a mouse or using some other input device at the instant the video indicates there was ball contact with the rim 1 or backboard 2. By synchronizing this or some other single event, the entire video will be synchronized to the timing of all of the goals and misses in the session.

It should be noted that it is not required that the microprocessor 12 accurately keep track of the date and time of day or have a precise real-time clock, as long as it has an accurate internal timer that can measure time from the initiation of a session. When the microprocessor 12 wirelessly 10 transfers data to the remote computational system 11, the remote computational system 11 can associate a particular date and time of day to the elapsed microprocessor time at the instant of data transfer. In this manner, all goals and misses may be associated with an accurate date and time of day and therefore, each shot in a video may be associated with a particular date and time of day.

After data from the microprocessor 12 is collected and associated with a particular date and time of day as well as associated with particular times in video data from a video recording source 18 by the remote computational system 11, the information may be stored on a database 20. In other words, the timing data from the sensors and microprocessor 12 is synchronized with the portion of the electronic video capture that is associated with a goal or miss indicated by the sensor timing data. By using a database 20 that is accessible through a network 19, the data may be shared and viewed by several people using secondary remote computational systems 21. All the above features allow for effective remote monitoring of sessions without the need to be present. For example, if coaches are unavailable to monitor a player practice session in person, they are still able to remotely view the performance of the practice session and monitor a video of each shot through a network 19 on a secondary remote computational system 21.

An important feature of the present invention is that it allows subsequent viewing of video of the practice session in an orderly, indexed manner. There is no need to view a video from beginning to end or to manually search through long stretches to find the precise shot that is desired. The synchronization of the shot goal/miss data to the video allow for a simplified viewing of any shot desired.

Figure 3:
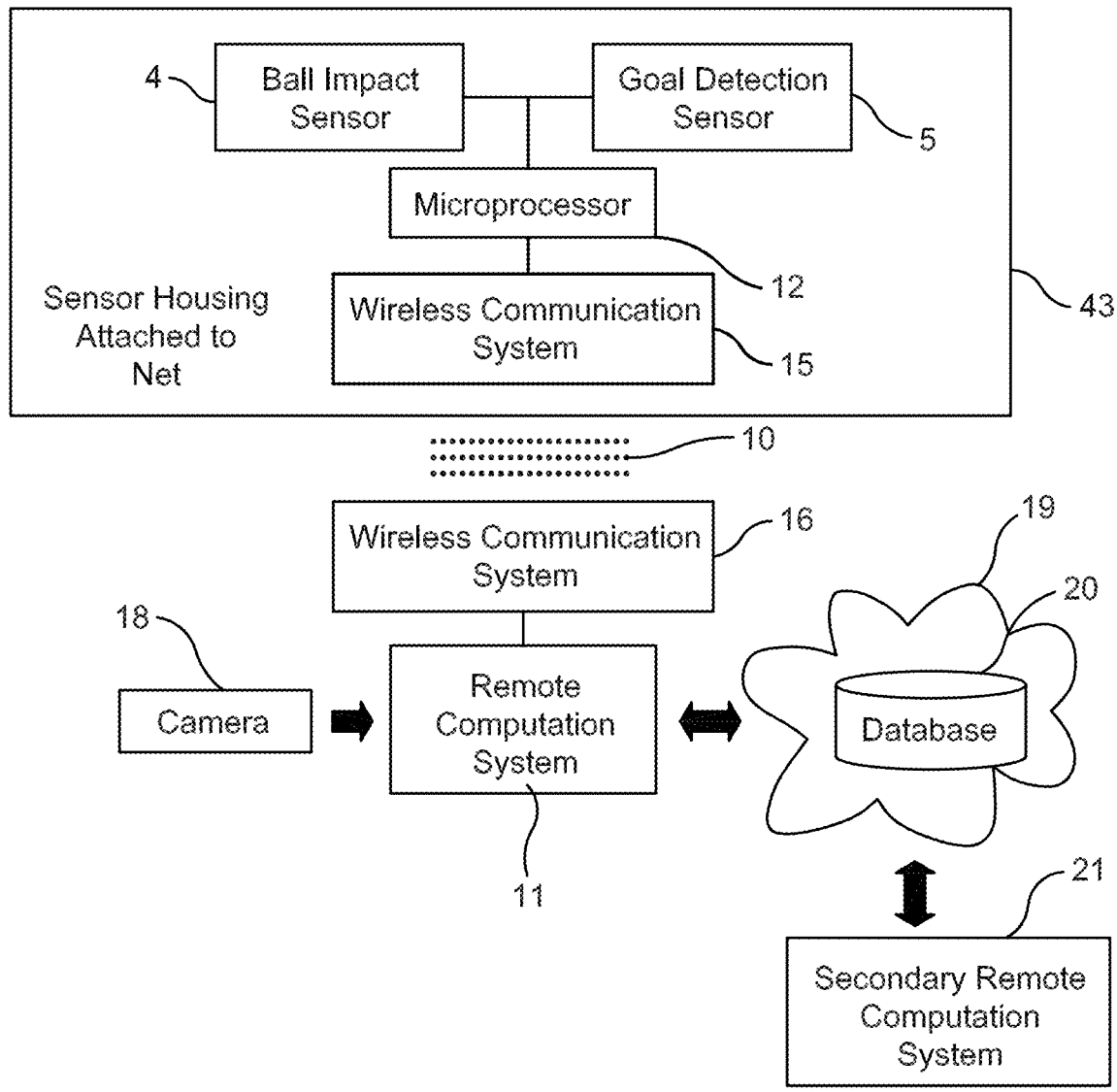
Figure 4:
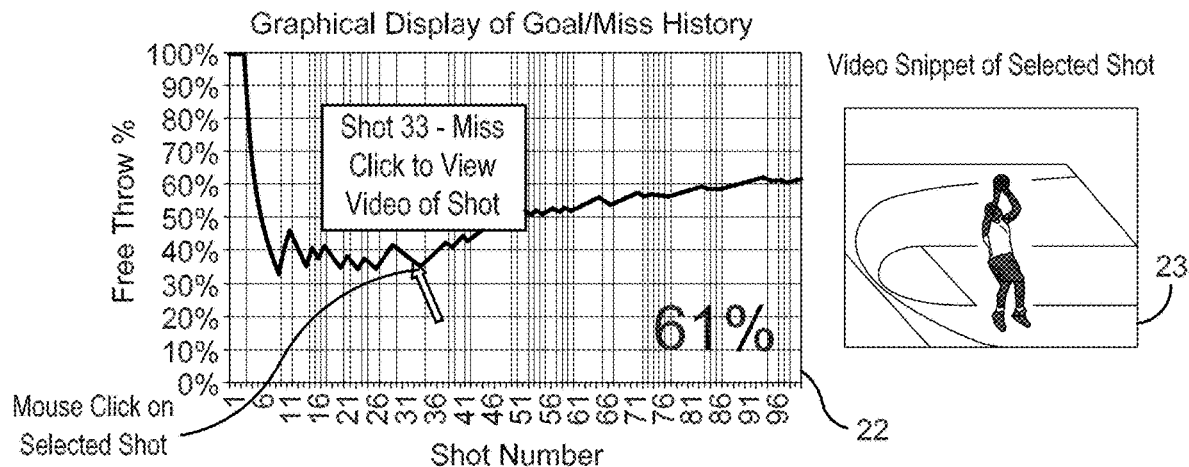
FIG. 4 illustrates a graphical user interface in accordance with the present invention.

Referring now to FIG. 3, a third embodiment of the present invention is illustrated. In this embodiment, the ball impact sensor 4 and the goal detection sensor 5 are both connected directly to the microprocessor 12 and an associated wireless communication system 15. Since this embodiment does not utilize a display unit 7, it may be both more compact and require less power to operate. An optional independent display unit 7 may be in wired or wireless communication with the remote computational system 11 in order to display results to players on the court. This allows this third embodiment to be more easily installed onto a rim 1 and net 34 system. In a preferred embodiment, the entire sensor 4, 5, microprocessor 12 and communication system 15 may simply be hung on the net 34. FIG. 4 shows one possible embodiment of a user interface that will allow viewers to index to the video of a desired shot. A line chart 22 is displayed to a user that presents the results for each shot. The chart background is colored for example in green or red columns indicating whether a shot was made (green) or missed (red). The superimposed plotted line shows the cumulative percent of shots that resulted in goals. By using a computer input device, such as a mouse, a touch screen or any other similar device, to indicate which shot is desired, a video snippet of just that shot may be immediately reviewed. This may be repeated for any number of shots. Each snippet may easily be constructed by the remote computational system 11, since internally, it has the video time stamp from the end of the previous shot and the video time stamp for the end of the current shot.

Figure 5:
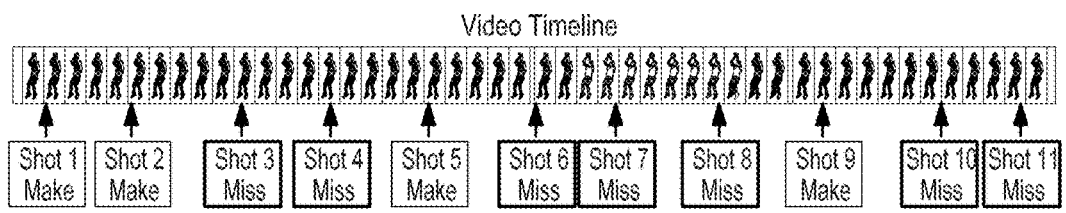
FIG. 5 illustrates a graphical user interface of a video sequence in accordance with the present invention.

FIG. 5 shows a second possible embodiment of a user interface that will allow viewers to index to the video of a desired shot. A timeline of a large portion or the entire video recording is displayed, with indicators for where shots were taken. By using a computer input device, such as a mouse, a touch screen or any other similar device, to indicate which shot is desired, a video snippet of just that shot may be immediately reviewed as previously described.

The video may either be stored as a single recording or may be broken up into a number of shorter recordings, each of which is associated with a shot as indicated by the sensor data. A software program such as the publically available program, FFMPEG, may be used to create multiple video files from the original video recording using a series of shot start and end times based on the sensor data. The end time for each shot would be close to the time that the sensors detect a miss, a goal or an air ball. The start time for each shot could either be close to the end time of the previous shot or some fixed time before the end time for the current shot. It may also be possible to analyze the video images to determine more precise start and end times using image or sound analysis software.

In addition to reviewing captured video on a shot-by-shot basis, the present invention may also be used to extract highlights of games or practice sessions. For example, if a player executed one or more shots with what he/she deems superior skill, he/she may share the highlights of the one or more shots with others. Similarly, if a player is struggling with his/her form on a particular shot, he/she may share the highlights of that shot with coaches or other experts for advice on how to make improvements.

One embodiment of the database 20 that stores data related to sessions includes the use of multiple tables for indexing the data. In the first table, the session information is stored. This may include: session ID, hardware ID, player name(s), team name, coach name(s), time/date of session, season of session, drill/play name, number of trials, number of goals, percent of goals, notes, voice messages, history of sequential shots status and timing during session (goal or miss), first shot ID to index into shot database and whether video was recorded. In a second table in the database, shot data may be recorded. This may include: shot ID, relative shot time, video file reference(s), notes and voice messages. In the preferred database embodiment, the session table does not include data on the timing, video file reference(s), notes or voice messages for each shot, but uses a first shot ID and the number of trials to allow the system to index into the shot table in the database for the appropriate list of shot-by-shot data. This makes for more efficient storage utilization of the database. Additional tables related to customer/user information, etc. may also be part of the database. One skilled in the art will understand that many variations of database architecture are possible.

Databases tables may have multiple levels of security to restrict access to authorized persons. For example, for data associated with a particular player, access may be restricted to that player and his/her coaches. Access to data related to team sessions may be restricted to players and coaches on that team, but not other teams. Players may opt to share data with other individuals if they wish.

Figure 6:
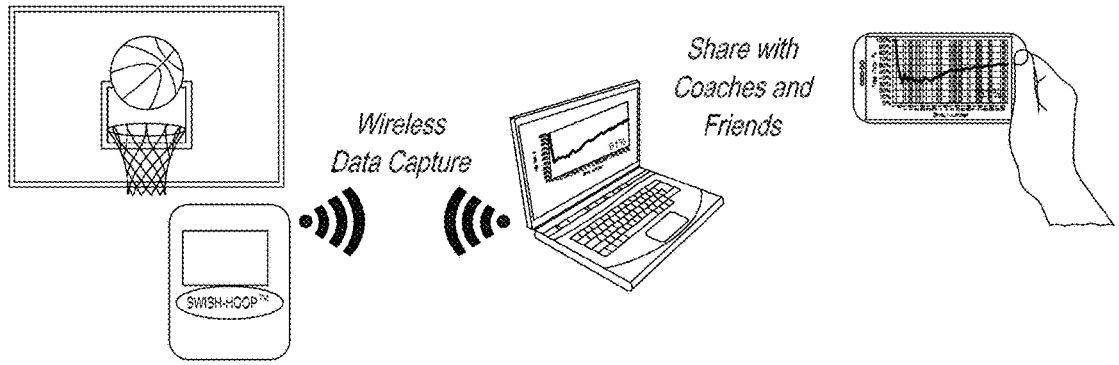
FIG. 6 illustrates a fourth embodiment of a basketball goal system in accordance with the present invention.

FIG. 6 shows a fourth embodiment of the invention, with a system configuration that allows monitoring of practice sessions remotely from any secondary remote computational system 21 such as a computer, smart phone, electronic tablet, etc., which can have access to the network where the database is stored.

In previously described systems such as Hampton, it is difficult to accurately determine whether a goal was made or whether the ball 33 came close enough to a sensor to falsely indicate a goal was made. The problem is that most of the sensors that have been described are precise enough to know whether the ball 33 passed through the rim or just close by. For a retro-reflective optical system that is configured to sense the reflection of a light beam off the ball 33 surface as it passes through the goal, it is difficult to adjust the sensitivity of such a system so that it can sense balls at different locations across the rim area and balls of different materials, colors and states of cleanliness, yet not sense any balls that fall outside of the bounds of the circular rim.

Figure 7:
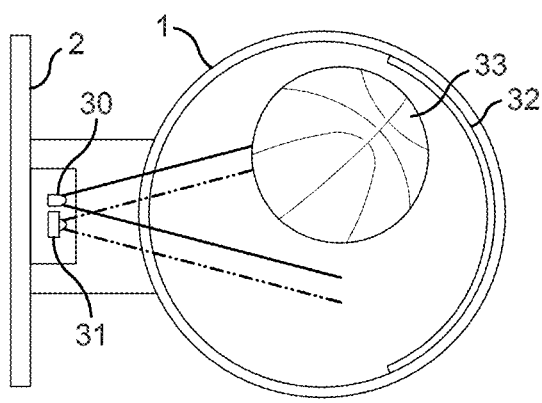
FIG. 7 illustrates a first embodiment of a goal detection sensor in accordance with the present invention.

FIG. 7 shows one embodiment of a goal detection sensor 5 that can more precisely make a determination of a goal. A retro-reflective infrared (IR) optical sensor is utilized, which includes a modulated IR light emitting diode (LED) emitter 30 such as a Vishay TSAL6400, a highly reflective tape or other material 32 on the inside diameter of the rim 1 or net 34 and IR-sensitive photodiode 31 such as a Vishay TS0P4838 or similar detector mounted adjacent to the LED emitter 30. In this embodiment, rather than sensing the reflection of the IR beam off the ball 33, the sensor is desensitized, so that reflection off the ball 33 does not generate a signal sufficiently bright to be detected by the photodiode 31. Although a desensitized IR detection system that can more precisely detect a goal may at first seem counterintuitive, when a highly reflective tape 32, such as 3M Scotchlite, is mounted on the inner surface of the distal portion of the rim 1 or net 34, a sufficient reflective signal may be generated and sensed by the photodiode 31, even when it is desensitized to ball 33 reflection. The reflective tape 32 utilizes micro prismatic corner cube technology that does not reflect light in a disperse pattern, but rather in a highly directional fashion, wherein light rays are precisely returned from the direction from which they came. Thus, as long as the photodiode detector 31 is located very close to the LED 30, a sufficiently large fraction of emitted light will be returned to the sensor 31. Because the tape 32 is able to reflect light rays from the same direction they impinge, the sensor 31 receives bright signals from across the entire length and width of tape, relatively independent of the light incident angle to the tape 32. Since the ball 33 is used to block the light returning from the highly reflective tape 32, the system is less sensitive to the optical properties of the ball 33 compared to a system that senses reflection from the ball 33. The present invention is less sensitive to both ball variations and false detection of balls outside the bounds of the rim 1 and thus can measure goals more reliably.

Figure 8:
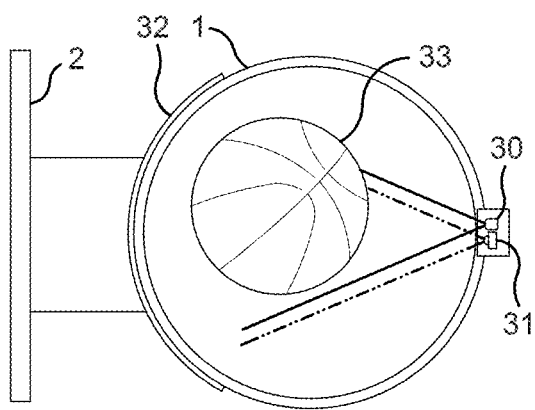
FIG. 8 illustrates a second embodiment of a goal detection sensor in accordance with the present invention.

FIG. 8 shows another embodiment of the goal detection sensor 5, the LED 30 and photodiode detector 31 are located at the distal side of the rim 1, away from the backboard 2 and the reflective tape or other material 32 is attached to the rim 1, rim support gusset 35 or the net 34. Generally, there is not a requirement for the reflective material to be inside the net 34, since there is sufficient reflective surface area that is visible by the detector around the net strings. This configuration has the advantage of using a relatively large reflective area of the rim support gusset 35 at the proximal side of the rim that is less distracting to a player than a similarly sized reflective area on the distal side of the rim.

Figure 14:
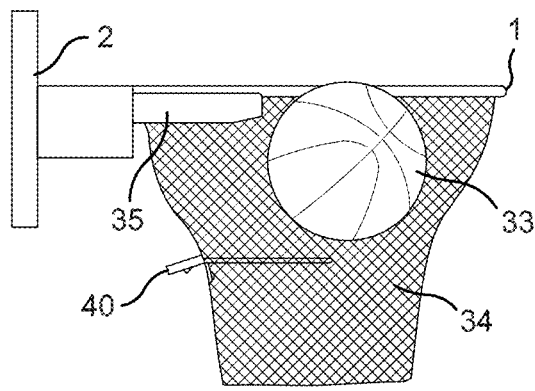
FIGS. 14 and 15 illustrate the operation of the preferred embodiment of a portion of the basketball performance monitoring system.
Figure 15:
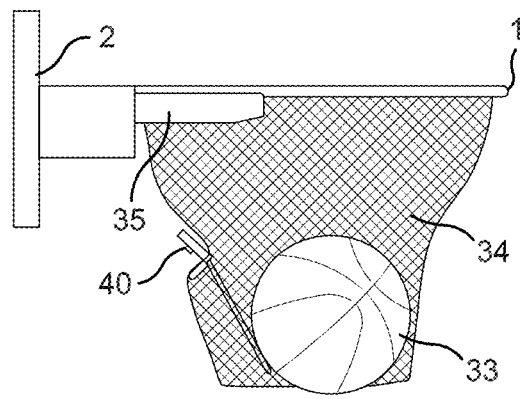

FIGS. 10, 11, 12 and 13 show a third embodiment of the goal detection sensor 5, wherein a sensing element such as an angle or tilt type switch, for example those from Sunhokey Electronics in Shenzhen, Guangdong, China utilizing either mercury or a rolling ball to complete a circuit, or an accelerometer is utilized. In this embodiment, a housing 43 that contains said goal detection sensing element is attached to the net 34 and has an arm 41 extending from it. The arm 41 may be in the shape of a hollow loop, a tongue, or any other appendage that will reliably be struck by a ball 33 passing through the net 34. Said arm 41 is positioned so as to extend out from the sensor housing 43 towards the center of the net 34. The housing 43 also preferably contains a ball impact sensor 4 with sufficient sensitivity to measure impact vibrations through the net, much like a spider might sense high-frequency vibrations through his/her web. As a ball 33 that successfully passed through the rim 1 enters the net 34, it will collide with the arm 41 and push it down, levering the entire sensor housing 43 and changing its angle as the ball 33 continues its downward path through the net 34. This change of angle of the sensor housing 43 relative to the direction of the force of gravity is sensed by the tilt-sensing goal detection sensor 5, which indicates a made shot. In a preferred embodiment, the arm 41 inside the net 34 is counterweighted by the housing 43 outside the net, although the housing may also be facing the inside of the net. Either the flexible net 34 or a rotating mechanical pivot may be utilized to hold the housing and arm approximately horizontally and allow it to tilt when activated. A net reference appendage, hook or arm 42, which is attached to the housing 43 may be utilized to restore the horizontal position of the arm 41 and housing 43 by relying on the physical position of the net 34 or rim 1 as a reference. The net reference arm 42 may extend either downward or upward and either lie against the net 34 or rim 1, hook over a portion of the net 34 or be fastened to the net 34. In order to restore the arm 41 and housing 43 to its original approximately horizontal position, the net reference arm 42 may rely on gravity and the compliance provided by the net 34 as shown in FIGS. 14 and 15, or an additional spring pivot attaching the net 34 or rim 1 to the sensor housing 43.

Figure 12:
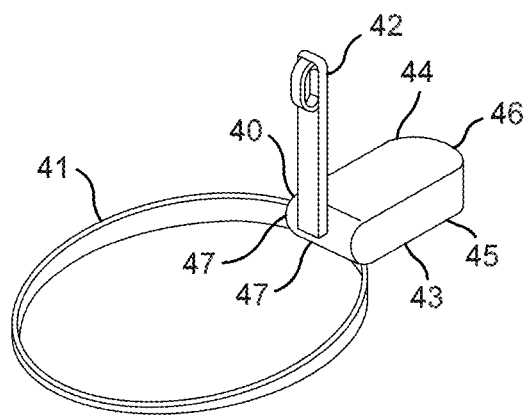
FIGS. 12 and 13 illustrate two configurations of a molded version of a preferred embodiment of a portion of the basketball performance monitoring system in accordance with the present invention.

FIG. 12 shows the details of a molded version of the third embodiment of the goal detection sensor 5 with an integrated ball impact sensor 4. In FIG. 12, the housing embodies a cover 44 a battery 46 and circuit board 45 onto which the goal detection tilt switch sensor 5 and the vibration based ball impact sensor 4 are mounted. The circuit board 45 may also include a microprocessor 12, a wireless communications device 15, power regulation circuitry and display hardware 8, such as LEDs. In a third embodiment illustrated in FIG. 12, the net reference appendage 42 is of the form of a hook that is secured over a loop in the net 34. This allows the entire package 40 to hang inside the net 34, with the housing 43 extending through to the outside of the net 34 to the back of the net 34 and the loop arm 41 extending towards the centerline of the net 34. It is important to select a sufficiently sensitive vibration sensor to serve as the ball impact sensor 4 that can reliably sense vibrations caused by ball 33 impacts anywhere on the rim 1 or backboard 2. One example highly sensitive vibration sensor is a double metal ball switch such as model BL600 from Bailin Electronics in Dongguan City, China. For this type of sensor, the change in contact state from closed to open happens very quickly in just a few milliseconds and with very little vibration energy. To sense the change of state of the sensor, the output of the sensor may be connected to an input pin of the microprocessor 12, which can trigger an interrupt within the microprocessor 12 to register the vibration. An interrupt is commonly used in computer control systems to trigger a piece of code called an interrupt service routine based on some event, either external to the microprocessor 12 or internal. In one embodiment, the microprocessor 12 keeps a count of the number of such interrupts within a short timeframe, say 100 milliseconds. At the end of the timeframe, the number of times that the interrupt was called is an indication of the strength of the vibration. For example, if the interrupt was called only once, then there might have been just a small amount of vibrating noise that should not be counted as a ball impact; however, if it was called say 5 times or more, then it may be reliably assumed that a ball impact occurred.

Figure 18:
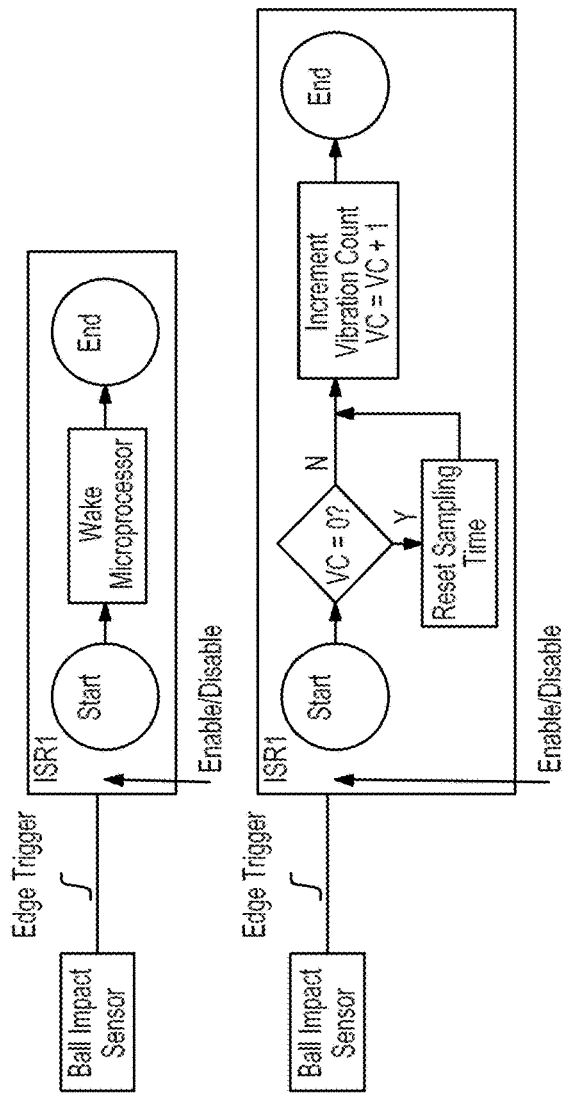
FIG. 18 illustrates a block diagram of an example microprocessor program for a basketball performance monitoring system.
Figure 18:
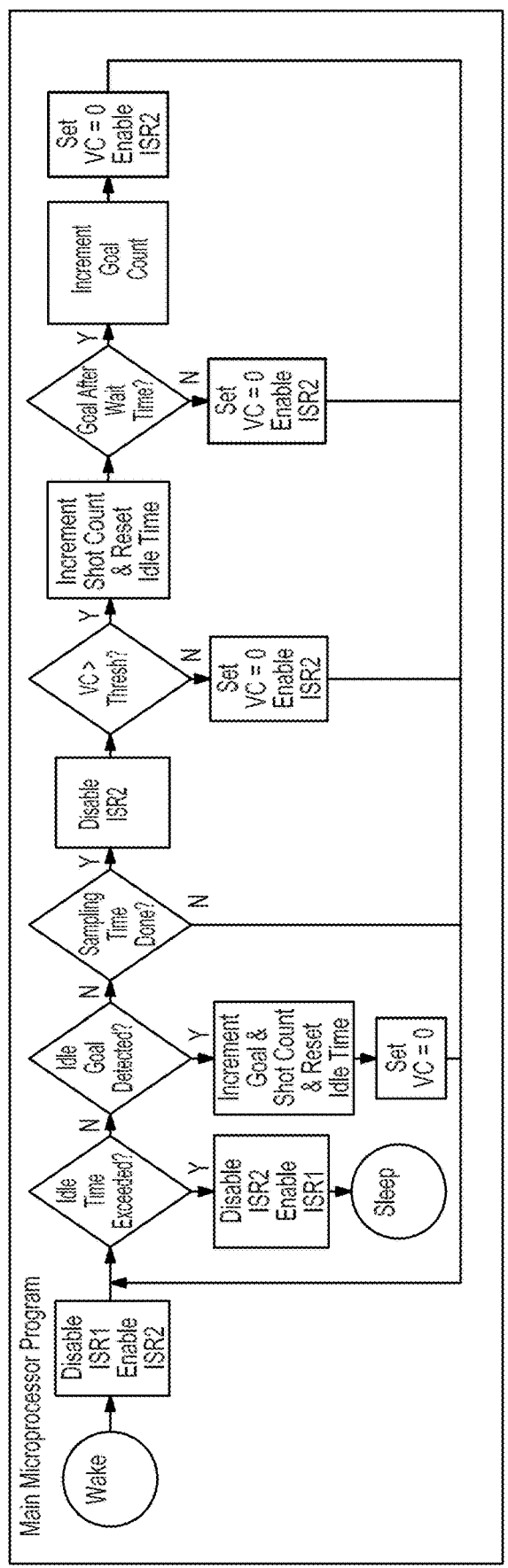

FIG. 18 illustrates an example software program that runs on the microprocessor 12. The program has a main program loop and two interrupt service routines (ISR1 and ISR2), which are triggered to execute by one or more of the sensors. In this example embodiment, the function of the program is to maintain counts of shots attempted (shot count) and goals made (goal count). In this example, the two interrupt service routines are triggered by a ball impact sensor 4, which is of a type that senses vibration through the making and breaking of an electrical contact one or more times, as described elsewhere. The main program loop is designed to execute when there is activity at the basketball system, but put the microprocessor 12 into a low-power sleep mode when a predetermined idle time has been exceeded. Idle time is the time frame over which no activity from any sensor has been detected. The function of ISR1 is to simply wake the microprocessor 12 from its sleep mode and start running the main loop portion of the program when a transition edge from low to high (or high to low) from the ball impact sensor 4 is seen. Once the microprocessor 12 is awakened, the first thing it does is to switch the interrupt service routine from ISR1 to ISR2. ISR2 increments a vibration count (VC) each time it is triggered. If the count is zero, this means it is the first time ISR2 has been called since the last time a count was completed and reset. Referring back to the main program loop, as long as the idle time has not been exceeded, the goal detection sensor 5 is checked to see if a goal has occurred. If so, both the shot count and the goal count are incremented and the idle time and vibration count VC are reset to 0. If not, then sampling time over which vibrations are counted is checked to see if it has reached a preset threshold, if not, the program returns to the beginning of the loop. If it has, then ISR2 is disabled so that the count does not change until it is re-enabled and the magnitude of the vibration count, VC, is checked to see if it exceeded a threshold number. If not, then the detected vibration is deemed to be spurious and VC is reset to 0, ISR2 is re-enabled and the program returns to the beginning of the main loop. If VC does exceed the preset threshold, then a vibration is deemed to be a ball impact and the shot count in incremented. After a ball impact, the program waits a period of time, say two seconds, to allow the ball a chance to bounce around the backboard 2 and rim 1 and either pass through the rim 1 or not. If after the wait time, no goal is detected by the goal detection sensor 5, the vibration count VC is reset to 0, ISR2 is re-enabled and the program returns to the beginning of the main loop. If a goal is detected, then the goal count is incremented before the vibration count VC is reset to 0, ISR2 is re-enabled and the program returns to the beginning of the main loop. Once the idle time is exceeded beyond a preset limit, then the program disables ISR2, enables ISR1, and then puts the microprocessor 12 into a sleep mode.

Figure 13:
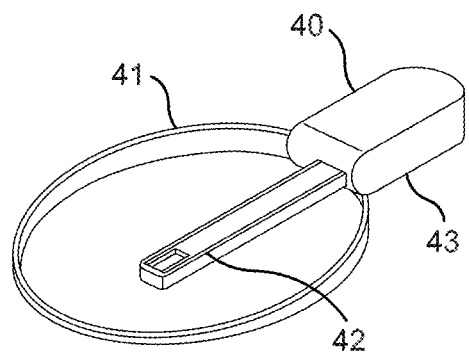

FIG. 13 illustrates how the a molded version of the main housing of the third embodiment of the goal detection sensor 5 may be designed so that a relatively simple two-part mold is used to simultaneously form the loop arm 41, the housing 43 and the net reference hook reference appendage 42 from a moldable plastic material. In this design, the hook reference appendage 42 is designed in approximately the same plane as the housing 43 and the loop arm 41 allowing for a simpler molding process and a relatively flat unit for ease of packaging. A living hinge is designed into the base of the hook reference appendage 42, where it meets the housing 43, allowing the appendage 42 to be bent upwards out of plane at close to a right angle and then snapped securely into place by securing features 47, so that it remains in this configuration, as shown in FIG. 12.

In a preferred embodiment of the performance monitoring system, the microprocessor 12, wireless communication system 15, ball impact sensor 4 and goal detection sensor 5 are all housed in a single sensor housing 43 along with a battery 46. By selecting an appropriate low-power ball impact sensor 4 and goal detection sensor 5, such as dry contact sensors, and programming the microprocessor 12 to go into low-power sleep mode when there is no activity, the portion of the system that is deployed near the rim 1 or net 34 for shot detection may be completely sealed from the elements and not require a change of battery, charging or other type of frequent manual attention. This allows a very low cost, low-maintenance system to be deployed, sealed against the weather and if desired, not taken down from the rim 1 or net 34 for many years.

Optionally, the remote portable computational device 11 may be mounted in a location that is clearly visible from the basketball court, such as on the backboard or backboard mounting pole, so that players are able to easily see the data displays from the court. Alternatively, the remote portable computational device 11 may be wearable, such as a watch or arm band, glasses, etc. Another embodiment would include multiple computational devices worn by multiple players. Portable remote computational devices 11 that are fitted with cameras 18 may also be used to record still or video images of players. These images may be used to either document individual players or teams during a shot or a play leading to a shot, or they may be used to track players during play.

If a rolling ball tilt switch type of sensor, for example from Sunhokey Electronics in Shenzhen, Guangdong, China, is utilized as the goal detection sensor 5, it may also be possible to use this same sensor as the ball impact sensor 4, as this type of sensor can measure both vibration and tilt angle. In this case, short contact/break cycles in the switch would signal a vibration and therefore a ball impact, while a more prolonged contact or break would signal a tilt and the detection of a goal.

In one embodiment, the ball impact sensor 4 may be comprised of multiple sensing elements that can localize the impact point. For example, one or more multi-dimensional accelerometers may be used to determine from what direction the initial impact occurs on a rim 1 or backboard 2 and a microprocessor 12 may record that location for feedback to the player or for archiving and analysis purposes. Different sensing modalities may be used, such as machine vision, multiple vibration sensors, accelerometers, strain sensors, pressure sensors, acoustic sensors, etc.

The present invention may be combined with other data capture technologies to provide for a richer analysis of practice sessions and games. For example, individual-player-tracking technologies can record player positions and motions while the present invention records shot results. Instrumented basketballs may be used to record arc shapes, ball spin, ball speeds, ball location, etc. and the present invention can relate these parameters to shot results. This enhanced data may provide more valuable feedback to players and coaches to further improve skills.

The present invention allows users to improve their skills through the use of a performance monitoring system. Having a reliable metric of performance that may be tracked through time is widely used in many fields from sports to business to help improve skills. The invention is flexible, as it may be used for many different types of shots including jump shots, free throws, 3-point shots, layups, etc.

The present invention may also be used to keep track of scoring during a conventional basketball game or during any number of non-conventional recreational basketball games such as those known colloquially as: H-O-R-S-E, 21, Fives, Around the World and Lightening. For example, in the popular game of H-O-R-S-E, players take turns trying to make a goal by shooting from a similar location to that of a player that made a goal on his/her most recent turn. By inputting the number of players into the remote computational system 11 at the beginning of the game, the present invention may cycle through the players and keep a record as to whether their attempt was successful or not and display the associated score for each player, including identification of the winner.

For embodiments of the current invention that include a camera system 18, still images or videos generated from the camera 18 may be used to identify players that are participating at any particular time, so that scoring or other activity may be attributed to the appropriate player or team. Image analysis of each player may include identification of particular colors of clothing, skin, glasses, facial characteristics, jersey numbers or graphics on clothing. Such image analysis may also track activities of one team versus another based on team uniform characteristics. Player identification may also be accomplished through RF identification tags, wireless beacons, etc. Embodiments capable of identifying which player shoots the ball may be used in more complex game or practice situations where multiple players are located near the goal and it would otherwise be difficult to identify the player that shot the ball.

Figure 16:
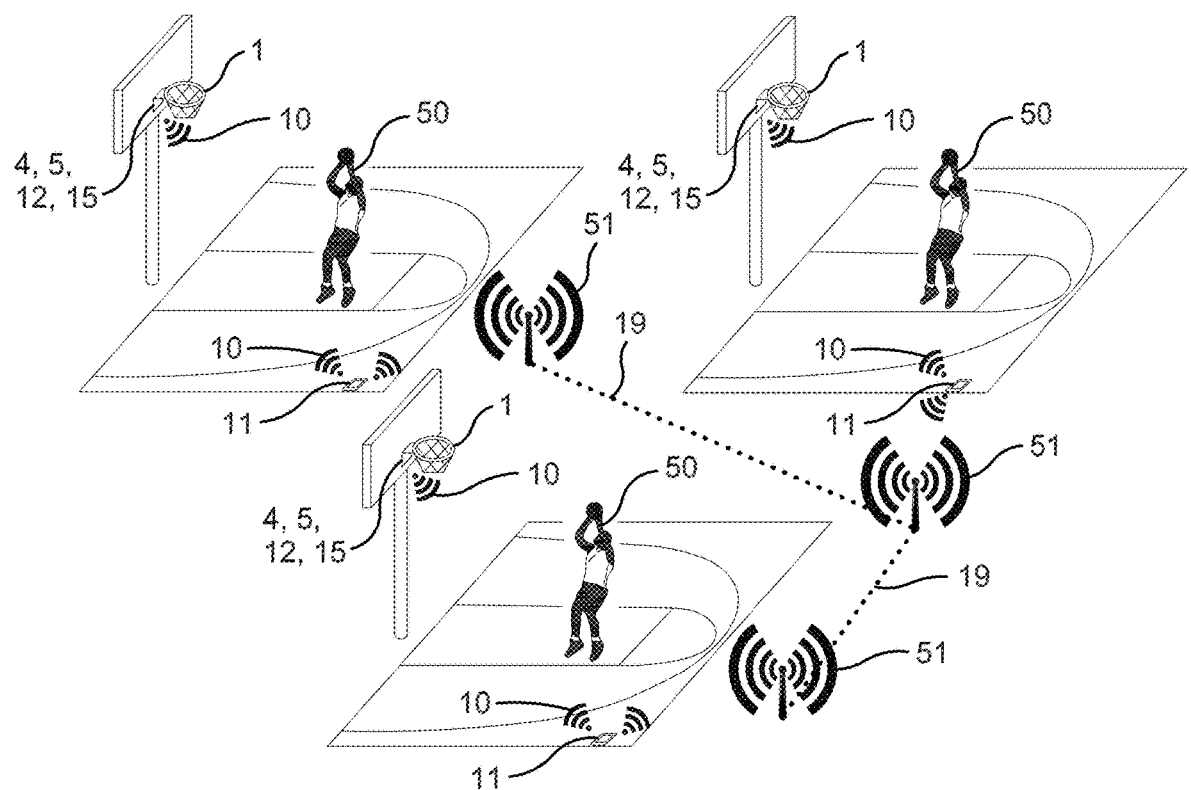
FIG. 16 illustrates a wireless and internet connection between multiple instances of the basketball performance monitoring system enabling joint play at remote locations.

In another embodiment of the current invention, players 50 at remote locations may jointly play basketball games with one another. As shown in FIG. 16, one or more microprocessors 12 connected to one or more sensors in the vicinity of the rim 1 can track whether shots were a miss or a goal. This may be communicated wirelessly 10 to a remote mobile computational system 11, which in turn can relay the data through a wireless or cellular system 51 to a network 19 such as the internet. The communicated data may be captured and communicated to remote one or more players 50, who have similar systems at remote basketball courts. If the remote computational systems 11 include input from a camera system 18, images or video may also be shared between remote players 50. With this networked configuration, non-conventional recreational games may be played between non-collocated players 50. The capture of video of a particular basketball shot from a camera 18 at one location and viewing, either real-time live streaming or delayed, of the video at another location enables the play of non-conventional recreational games such as H-O-R-S-E. Without such shared video, verbal descriptions of the shot would make the game overly cumbersome. This enables remote players 50 to attempt to reproduce shots in order to earn points in the game or whatever the objective of the game might be.

Figure 17:
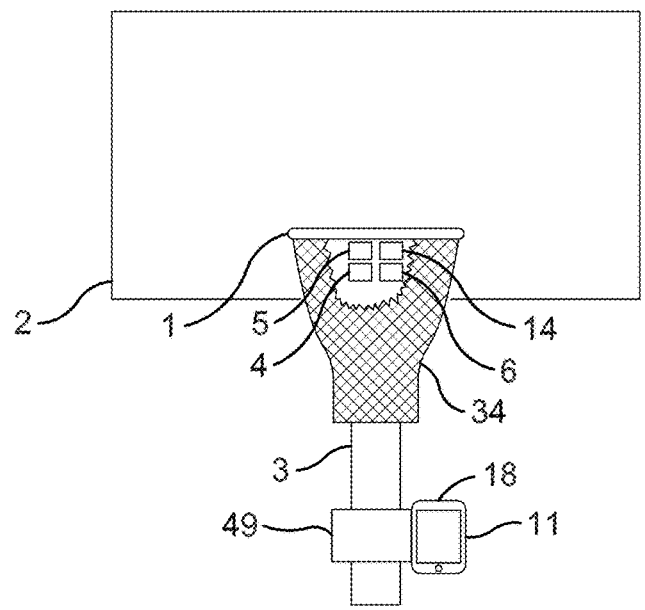
FIG. 17 illustrates one possible location for a mobile remote computational system, where it is mounted to the pole using a holder.

When using a remote computational system 11 that is a mobile device, such as a smart phone, a tablet or similar device, in a game with non-collocated players, it may be convenient to locate the remote computational system 11 on, near or behind the backboard 2 or pole 3, as shown in FIG. 17. This easily allows each player to monitor the current score as well as shots from the other players. Preferably, the remote computational system 11 would be attached by a holder 49 that has some compliance and can protect the device 11 in case the ball 33 impacts it. In addition, devices 11 that are mounted to the pole 3 or backboard 2 and outfitted with cameras 18 and the appropriate custom app (software) can record and send video or still imagery of a player to the other non-collocated players, as the devices are positioned in an ideal location to record much or all of the action that a player may want to transmit. Thus, the only requirements to play games with non-collocated players is a performance monitoring system, as described herein, a camera-integrated mobile computational device 11 running the appropriate app, a holder 49 that positions the device on, near or behind the backboard 2, court or pole 3 and an internet connection.

Turning now to FIGS. 19-24, the sensor housing 43 for the basketball performance monitoring system can be easily installed onto and removed from the basketball net 34. This is a significant improvement over previous systems that require users to climb a ladder or lower the goal so that they may more easily access the rim 1 and net 34 to install or remove a sensor. Most of the prior art does not contemplate the fact that users will want to frequently install and remove sensors from a basketball goal when they start and complete a practice session.

Figure 21:
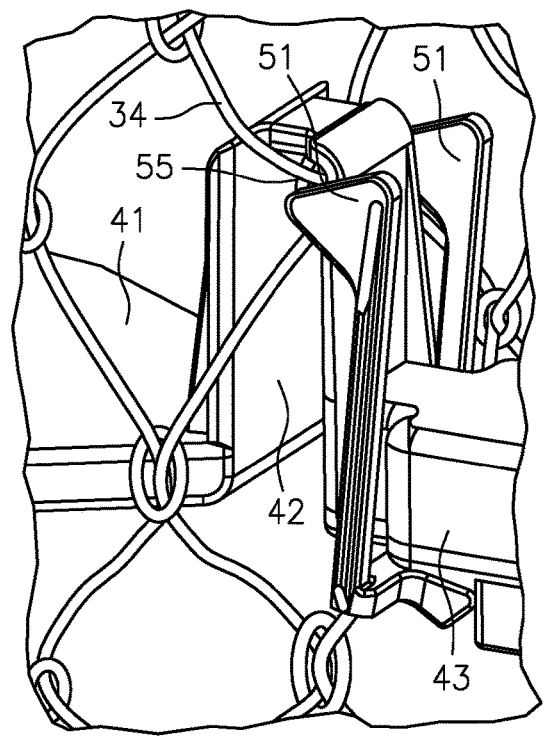
FIG. 21 shows a detailed view of the alternate embodiment of the goal detection sensor installed on a net in accordance with the present invention.

The installation and removal of the sensor system from the basketball net 34 is accomplished through the use of a long installation rod 52 that is held by a user on the ground and interacts with the sensor housing 43. The housing 43 includes a housing first end 62 and a housing second end 64 opposite the first end 62. The act of connecting the installation rod 52 activates the opening of a latch 51 that allows the sensor system to be secured to the net 34. The latch 51 includes a latch arm 66 having a lower portion 68 and an upper portion 70 opposite the lower portion 68. A coupler 72 is formed from the upper portion 68 of the latch arm 66. The act of removing the installation rod 52 from the sensor housing 43 closes the latch and secures the sensor onto the net 34. The latch 51 and U-shaped net reference appendage, or simply U-shaped appendage 42 can trap two strings of the net 34 that are on opposite sides of a knot 55 and securely locate the sensor housing 43 to the net 34 as shown in FIG. 21 by trapping the net strings and knot 55. The U-shaped appendage 42 includes a depth 80 configured to trap strings 34 of the net 34.

Figures 19, 20:
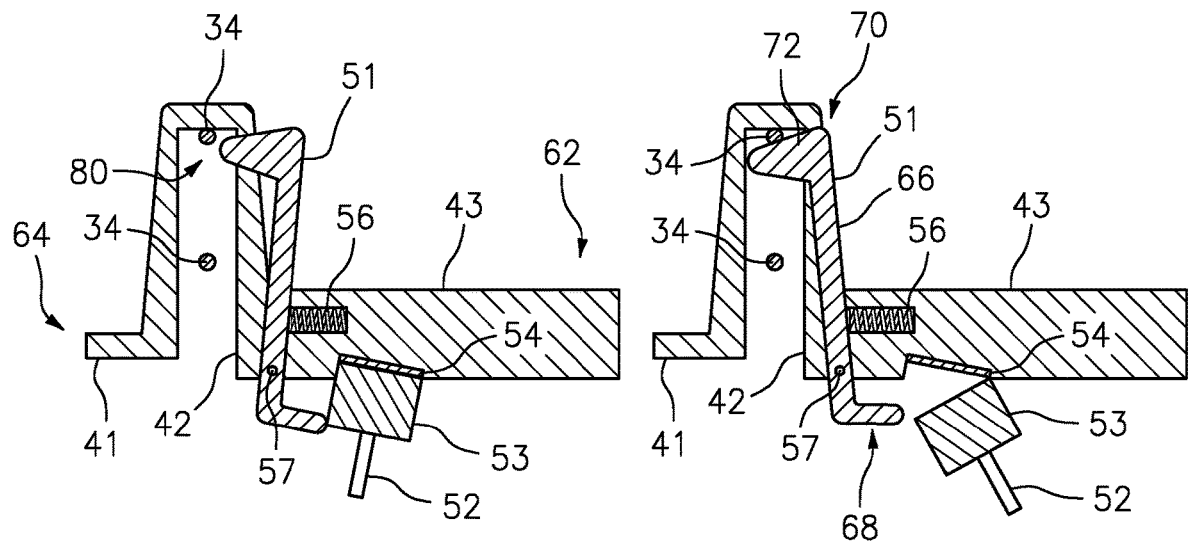
FIG. 19 shows an alternate embodiment of the goal detection sensor in accordance with the present invention.
FIG. 20 shows the same alternate embodiment as FIG. 19 of the goal detection sensor in accordance with the present invention.

In one embodiment, the distal end of the installation rod 52 has a magnet 53 that helps to secure the installation rod to the sensor housing 43 by magnetically attracting a steel slug 54 or opposite-poled magnet 54. It will be apparent to one skilled in the art that either the installation rod 52 or the housing 43 may have the slug or magnet or two magnets, with similar results. In the embodiment shown in FIGS. 19 and 20, the latch 51 is held closed by a spring, or biasing member 56. When the installation rod 52 is connected at an angle as shown in FIG. 20, it may be rotated about an edge of its end into the configuration shown in FIG. 19. This rotation pushes against the lower portion of the latch 51 across a pivot 57 and compresses the spring 56 of the latch 51, aided by the attraction of the rod magnet 53 to the slug 54. Because of the attraction between the magnet 53 and the slug 54, this latch 51 opening occurs essentially automatically without significant effort from the user. Thus, just the action of inserting the installation rod 52 can unlatch the sensor and allow for easy removal or installation. The attraction between the rod magnet 53 and the slug 54 also helps to guide the end of the rod 52 when the user is trying to connect it to the installed sensor housing 43 from the distant ground, thereby making a challenging remote-docking task relatively simple and automatic.

The spring 56 that holds the latch 51 closed may be incorporated into the shaft that comprises the pivot 57 of the latch 51. This simplifies the system, as it reduces the part count and allows the spring 56 to be molded as an integral part of the latch 51 at very little cost. One embodiment for the integral spring 56 is to configure the pivot as a narrow shaft whose ends are fixed to the latch 51 and is allowed to torsionally deflect. A tab in the center of the shaft articulates with a feature of the sensor housing 43 and provides the stationary reference for the spring 56.

It may not be apparent why a latch 51 is preferred over a passive sensor housing 43 that may for example simply be clipped over the net strings 34 using a spring clip. When the basketball 33 enters the rim 1 and net 34, it may be moving at a high rate of speed. Often, when the ball 33 is "caught" by the net 34, much of the ball's kinetic energy is transferred to the net 34, which can stretch and move violently at high accelerations. Thus, a sensor housing 43 that is passively clipped to the net 34 may get easily displaced from a position where it can properly function. In addition, because the net 34 is extremely flexible, it may be difficult to remove a clipped-on housing 43 using the long installation rod 52. An integrated latch 51 solves these issues, as it securely locks the sensor housing 43 in position on the net 34 and when opened, applies very little force against the net 34 to be removed.

Figure 22:
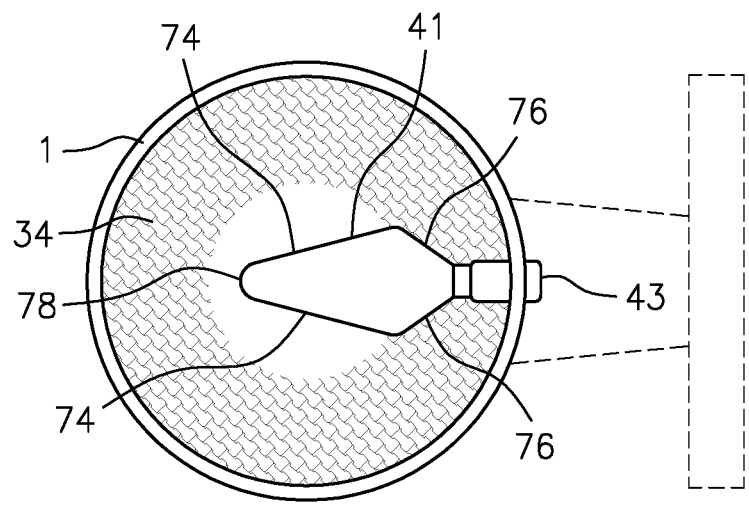
FIG. 22 shows a top view of the alternate embodiment of the goal detection sensor installed on a net in accordance with the present invention.
Figure 23:
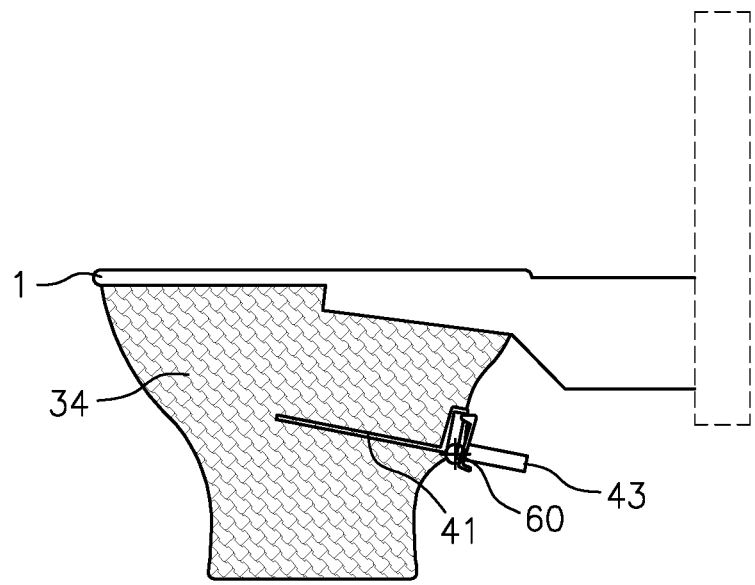
FIG. 23 shows a side view of the alternate embodiment of the goal detection sensor installed on a net in accordance with the present invention.
Figure 24:
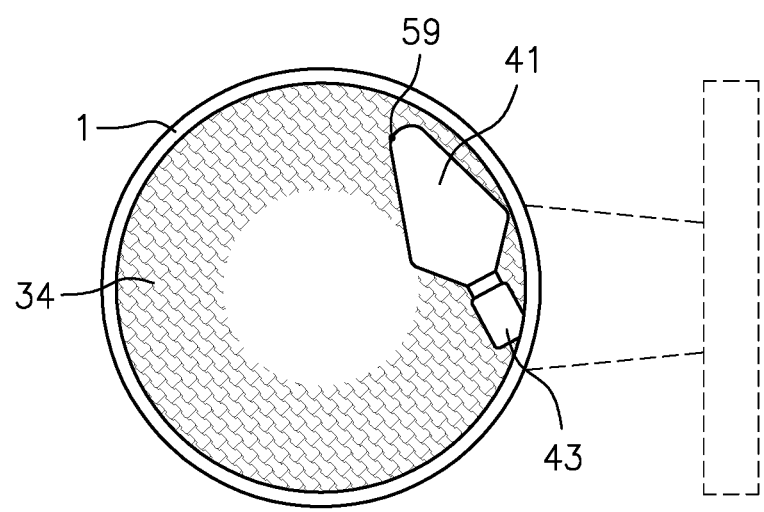
FIG. 24 shows another top view of the alternate embodiment of the goal detection sensor installed on a net in accordance with the present invention.

There are four additional geometric features of the sensor housing 43 and arm 41 that help to keep the arm 41 relatively level and centered within the net 34, as shown in FIGS. 22 and 23, so that it may capture the passing of the ball 33 after a goal. First, the arm 41 is relatively flat, broad and has sides, such as insertion sides 74, positively angled, (as opposed to negatively angled), towards the tip. The sides of the arm 41 include a pair of insertion sides 74 proximate an arm tip 78. The pair of insertion sides 74 are adjacent and/or integral with a pair of removal sides 76 proximate the U-shaped appendage 42. This reduces the likelihood that the arm might get tangled in a net loop 59 (FIG. 24), as the positively angled sides will more likely slip past the net strings 59 and allow the arm 41 to return to its nominal position centered in the net 34 as shown in FIGS. 22 and 23. Second, the center of mass 60 of the sensor/housing assembly is located below the inverted-U-shaped net reference appendage 42 and slightly back (away from the arm 41) from the point that hooks over the net 34. This helps to assure that the tilt sensor 5 has a resting angle that is in the off position. Third, the inverted-U-shaped net reference appendage 42 helps to right the sensor since it traps some of the net strings 34. As the net 34 returns to its rest position under the influence of gravity, it tends to return the sensor to the horizontal position. Fourth, the sides of the arm 41, such as the removal sides 76, that are closest to the point where the inverted-U-shaped net reference appendage 42 hooks over the net have a steep negative angle so as to fend off the net 34 should the arm be twisted towards the side of the net 34 away from the centerline. This helps to keep the arm 41 centered in the net 34.

As can be seen from the foregoing description, the present invention provides a means for monitoring skills training in order to optimize performance and improve skills. The present invention automatically tracks and reports success of making goals and allows for simple review of video snippets synchronized to each shot and furthermore provides a reliable sensing technology for measuring goals.

In addition to recreational games, the present invention may be used in games that include wagering. A number of features of the present invention make games that include wagering more likely to produce acceptable outcome from all parties' perspectives. First, because a number of systems may be networked together, individuals who are wagering on a challenge or a game of skill do not need to be collocated and may be in disparate locations. Second, because the results are automated via the sensor measurements, the outcomes of wagers do not depend on human subjectivity. Third, with the previously described video capture and synchronization with individual shots, the likelihood of unfair play by shooting a ball from an easier location than claimed is minimized, as all wagering participants may view the shots from all players. Thus, the use of the basketball performance monitoring sensor hardware, networking, video capture and synchronization may produce a unique method for wagering on games of basketball shooting skill.

There has been provided a basketball performance monitoring system. While the basketball performance monitoring system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system for creating and viewing indexed video snippets of a series of shots toward a goal comprising:
   at least two sensors proximate a goal directly connected to a microprocessor, said microprocessor configured to record a triggering event responsive to a ball-shooting detection of at least one of said series of shots toward the goal, by at least one of the at least two sensors;
   electronic times that represent timing by said microprocessor of said triggering event responsive to a ball-shooting detection by at least one of the at least two sensors of at least one of said series of shots toward the goal;
   one or more video recordings captured by at least one recording source;
   starting times and stopping times, identified from said electronic times, corresponding to a start of each shot and an end of each shot for said one or more video recordings;
   wherein at least one of the at least two sensors which detects ball shooting is a ball impact sensor; wherein at least one of the at least two sensors which detects said ball shooting is a goal detection sensor;
   wherein said ball impact sensor measures a ball impact with at least one of a rim or a backboard using at least one of a vibration detection, an acceleration detection, a strain detection, a pressure detection and an acoustic detection;
   wherein said goal detection sensor measures a ball passing through the goal generating a goal datum, or a ball not passing through a goal subsequent to a ball-impact sensor detection, generating a miss datum by at least one of an optical-retro-reflective detection, a vibration detection, a strain detection, an acceleration detection, an angle detection, and a tilt detection;
   wherein said starting times and said stopping times are utilized for editing of said one or more video recordings and said edited video recordings are associated with corresponding said sensor-measured goal/miss data; associated portions are stored as separate video snippets; and
   said video snippets are indexed and synchronized to the goal/miss data by the corresponding shots toward the goal.

2. The system according to claim 1, further comprising:
   an input device, said input device configured to view said video snippets on a remote computational device and said input device configured to select at least one of said shots toward the goal from a chart that graphically displays the series of shots and wherein said selection triggers a viewing of a corresponding video snippet.

3. The system according to claim 1, wherein said at least one video recording source is directly connected to or part of a remote computational device;
   said electronic times are used to identify the starting times and the stopping times for videos being recorded on said computational device;
   said starting times and said stopping times are selected so as to capture an approximate start through an approximate end of each shot toward the goal of said series of shots; and
   each of said one or more video recordings corresponding to a single shot toward the goal are stored in separate electronic files.

4. The system according to claim 1, wherein said one or more video recordings contain video of multiple shots; said electronic times are used to identify the starting times and the stopping times for video editing on a computational device;
   said starting times and said stopping times are selected so as to capture the start through the end of each shot of said series of shots; and
   said one or more video recordings of said multiple shots are edited and stored as indexed multiple electronic files, one for each shot.

5. The system according to claim 4, wherein identifying the starting times and the stopping times uses a single event for synchronization between said electronic times and video time stamps.

6. The system according to claim 3, wherein each said shot toward the goal of said series of shots is either a goal or a miss within a ball-shooting session.

7. The system according to claim 4, wherein each said shot toward the goal of said series of shots is either a goal or a miss within a ball-shooting session.

8. The system according to claim 5, wherein said single event for synchronization is said ball-shooting detection.

9. A method for creating indexed video snippets of a series of shots toward a goal comprising:
   synchronizing electronic clocks between a microprocessor and a remote computational system;
   measuring electronic times of a single triggering event per shot related to a ball shooting, said times recorded by said electronic clocks within said microprocessor, which is connected to sensors responsive to a ball-shooting, said sensors comprise one of a ball impact sensor and one of a goal detection sensor;
   wherein said ball impact sensor measures a ball impact with at least one of a rim or a backboard using at least one of a vibration detection, an acceleration detection, a strain detection, a pressure detection and an acoustic detection;
   wherein said goal detection sensor measures a ball passing through the goal generating a goal datum, or a ball not passing through a goal subsequent to a ball-impact sensor detection, generating a miss datum by at least one of an optical-retro-reflective detection, a vibration detection, a strain detection, an acceleration detection, an angle detection, and a tilt detection;

identifying a starting time and a stopping time based on said electronic time of each of said single triggering events for each shot;

creating indexed video snippets of shots toward a goal based on said synchronized clocks, said starting time and said ending time and said goal/miss data;

selecting one or more shots toward the goal from a chart; and viewing the corresponding one or more video snippets for the selected one or more shots toward the goal.

10. The method according to claim 9, wherein said viewing occurs through a network on a remote computational system.

11. A system for creating and viewing indexed video snippets of a series of shots toward a goal comprising:

at least two sensors being attached proximate the goal and directly connected to a microprocessor, said microprocessor configured to trigger responsive to a ball-shooting detection of at least one of said series of shots toward the goal; at least one of said at least two sensors comprising a ball impact sensor and at least one of said at least two sensors comprising a goal detection sensor;

wherein said ball impact sensor measures a ball impact with at least one of a rim or the backboard using at least one of a vibration detection, an acceleration detection, a strain detection, a pressure detection and an acoustic detection;

wherein said goal detection sensor measures a ball passing through the goal generating a goal datum, or a ball not passing through a goal subsequent to a ball-impact sensor detection, generating a miss datum by at least one of an optical-retro-reflective detection, a vibration detection, a strain detection, an acceleration detection, an angle detection, and a tilt detection;

electronic times that represent timing by a clock within said microprocessor of a triggering event related to said ball-shooting detection;

one or more video recordings captured by at least one recording source connected to or part of a remote computational device;

a time synchronization based on the synchronization of said clock within said microprocessor and a clock within said remote computational device;

wherein said electronic times and said time synchronization are utilized to associate portions of said one or more video recordings with corresponding shots toward the goal; said associated portions are stored as separate video snippets; and said video snippets are indexed by the corresponding the goal/miss data.

* * * * *